(12) United States Patent
Tanabe et al.

(10) Patent No.: US 7,015,619 B2
(45) Date of Patent: Mar. 21, 2006

(54) MOLDED MOTOR

(75) Inventors: Takeshirou Tanabe, Fukui-ken (JP); Yuusuke Kikuchi, Kanagawa-ken (JP)

(73) Assignee: Nidec Shibaura Corporation, Fukui-ken (JP)

( * ) Notice: Subject to any disclaimer, the term of this patent is extended or adjusted under 35 U.S.C. 154(b) by 0 days.

(21) Appl. No.: 10/699,093

(22) Filed: Oct. 31, 2003

(65) Prior Publication Data

US 2005/0093379 A1 May 5, 2005

(51) Int. Cl.
*H02K 1/12* (2006.01)
(52) U.S. Cl. ......................................... 310/254; 310/43
(58) Field of Classification Search ................ 310/254, 310/216, 217, 43, 87, 260, 270
See application file for complete search history.

(56) References Cited

U.S. PATENT DOCUMENTS

| | | | | |
|---|---|---|---|---|
| 4,365,180 A | * | 12/1982 | Licata et al. ................. 310/216 |
| 4,651,039 A | * | 3/1987 | Yamamoto et al. ............ 310/87 |
| 4,752,707 A | * | 6/1988 | Morrill ........................ 310/184 |
| 5,831,366 A | * | 11/1998 | Kern et al. .................. 310/216 |
| 5,986,377 A | * | 11/1999 | Yamada et al. ............. 310/216 |
| 6,002,185 A | * | 12/1999 | Nakao et al. ................. 310/43 |
| 6,166,468 A | * | 12/2000 | Suzuki et al. ................. 310/90 |
| 6,590,310 B1 | * | 7/2003 | Takano ........................ 310/254 |
| 6,673,463 B1 | * | 1/2004 | Onishi et al. ............... 428/480 |
| 6,729,011 B1 | * | 5/2004 | Asao et al. .................... 29/596 |
| 6,741,005 B1 | * | 5/2004 | Vohlgemuth ................. 310/216 |

FOREIGN PATENT DOCUMENTS

| | | |
|---|---|---|
| JP | 09308143 | 11/1997 |
| JP | 10136589 | 5/1998 |
| JP | 10271715 | 10/1998 |

* cited by examiner

*Primary Examiner*—Darren Schuberg
*Assistant Examiner*—Nguyen Hanh
(74) *Attorney, Agent, or Firm*—Jordan and Hamburg LLP

(57) ABSTRACT

A molded motor has a motor frame molded by covering a stator made from a straight core, with a molding resin. The straight core has a stack of laminas each having a plurality of tees projecting from one long side of a belt-shaped back yoke and a V-shaped cut formed between every two adjoining tees along the back yoke and on a side from which the tees project. The straight core has an insulating layer thereon, formed by pre-molding from an insulating resin, excluding at least an inner periphery of each tee. The straight core also has a winding formed about each tee having the insulating layer formed thereon. The stator is formed by bending the straight core at cuts made therein into an arcuate or annular shape, and joining the opposite ends of the back yokes to each other by welding or adhesion.

8 Claims, 9 Drawing Sheets

F I G . 5
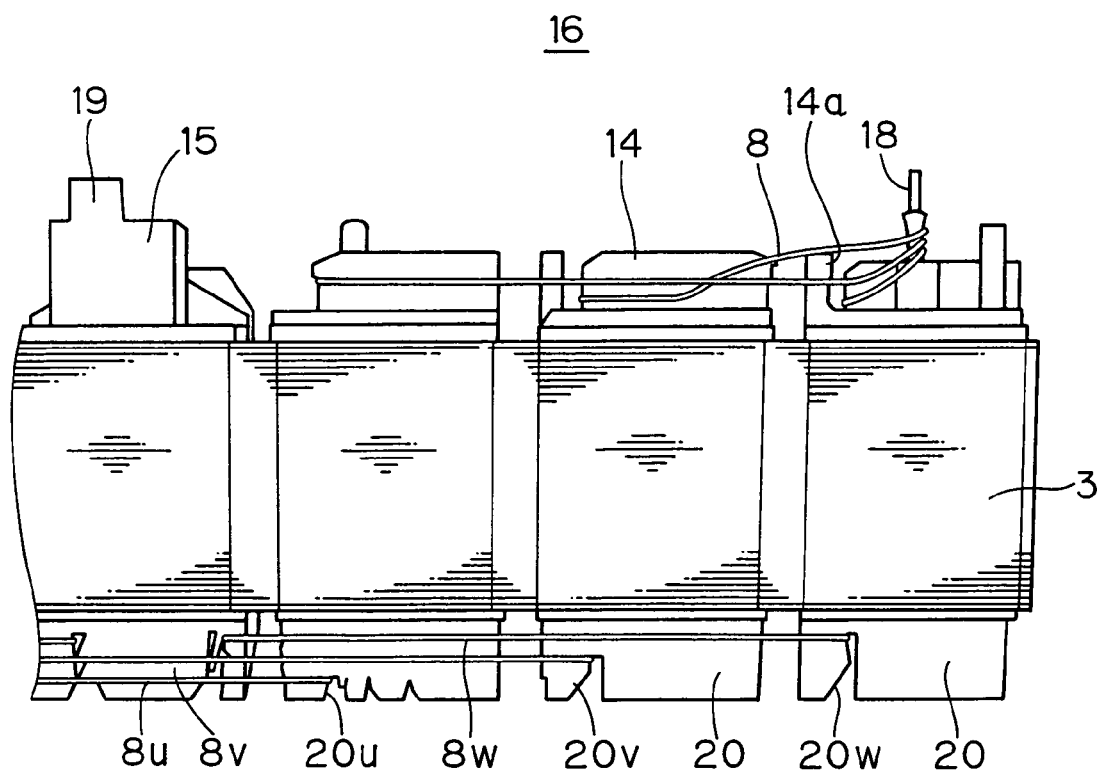

MOLDED MOTOR

FIELD OF THE INVENTION

This invention relates to a molded motor.

BACKGROUND OF THE INVENTION

A stator for a molded motor is made by a common method in which an annular stator core is used, or a method in which a linear stator core (usually called a straight core) is bent into an annular shape. The prior art involving a straight core is disclosed in Japanese Patent Publications JP-A-9-308143, JP-A-10-136589 and JP-A-10-271715.

As a matter of fact, however, the manufacture of a molded motor using a straight core is difficult to carry out only with the art mentioned above.

This invention, therefore, provides an invention which ensures the manufacture of a molded motor using a straight core.

DISCLOSURE OF THE INVENTION

According to a first embodiment, the apparatus of the present invention is a molded motor having a motor frame molded by covering a stator composed by a straight core with a molding resin, the straight core comprising a stack of laminas each having a plurality of tees projecting from one long side of a belt-shaped back yoke and a V-shaped cut formed between every two adjoining tees along the back yoke and on its side from which the tees project, the straight core having an insulating layer formed by pre-molding from an insulating resin on its portions excluding at least the inner periphery of each tee, the straight core further having a winding wound about each tee having the insulating layer formed thereon, the stator being formed by bending the straight core at the cuts into an arcuate or annular shape, and joining the opposite ends of the back yokes to each other by welding or adhesion.

According to a second embodiment, the apparatus of the present invention is a molded motor as set forth in the first embodiment, in which the joined ends of each back yoke are shaped like a crank.

According to a third embodiment, the apparatus of the present invention is a molded motor as set forth in the first embodiment, in which the motor frame is molded around the longitudinal axis of the stator by covering an entire outline of the stator, excluding an inside diametrical portion thereof, with the molding resin.

According to a fourth embodiment, the apparatus of the present invention is a molded motor as set forth in the first embodiment, in which the molding resin is an insulating resin, or premix.

According to a fifth embodiment, the apparatus of the present invention is a molded motor as set forth in the first embodiment, in which a wiring circuit board is embedded in the motor frame.

According to a sixth embodiment, the apparatus of the present invention is a molded motor as set forth in the first embodiment, in which a wiring circuit board is embedded in the motor frame and the straight core has a plurality of supports, as well as the insulating layer, pre-molded on one side thereof for mounting the wiring circuit board.

According to a seventh embodiment, the apparatus of the present invention is a molded motor as set forth in the sixth embodiment, in which positioning projections for positioning the wiring circuit board protrude from the supports and the wiring circuit board is held therebetween.

According to an eighth embodiment, the apparatus of the present invention is a molded motor as set forth in the first embodiment, in which the straight core has a covering, as well as the insulating layer, pre-molded on one side thereof, and a plurality of binding pins projecting from the covering for wiring the winding.

According to a ninth embodiment, the apparatus of the present invention is a molded motor as set forth in the eighth embodiment, in which the binding pins are formed on the outer periphery of the first to third tees from the tee at either end of the straight core.

According to a tenth embodiment, the apparatus of the present invention is a molded motor as set forth in the eighth embodiment, in which the binding pins include a neutral point binding pin formed on the back yoke situated on the outer periphery of one of the first to third tees from the tee at one end of the straight core, and the binding pin for each phase is formed on the back yoke situated on the outer periphery of one of the first to third tees from the tee at the other end of the straight core, or on a plurality of such tees.

According to an eleventh embodiment, the apparatus of the present invention is a molded motor as set forth in the first embodiment, and is a brushless DC motor.

According to a twelfth embodiment, the apparatus of the present invention is a molded motor as set forth in the first embodiment, in which there are 12 tees.

According to a thirteenth embodiment, the apparatus of the present invention is a molded motor as set forth in the eleventh embodiment, in which the brushless DC motor is three-phase; there are 12 tees; there is a U-phase winding around the first, fourth, seventh and tenth tees from the tee at either end of the straight core; there is a V-phase winding around the second, fifth, eighth and eleventh tees; and there is a W-phase winding about the third, sixth, ninth and twelfth tees.

According to a fourteenth embodiment, the apparatus of the present invention is a molded motor as set forth in the first embodiment, for use in an air conditioner, pump, washing machine, or air cleaner.

The apparatus according to the first embodiment of the present invention is a molded motor manufactured from a straight core.

The apparatus according to the second embodiment of the present invention makes it possible to reduce any winding defect caused by welding and improve the flow of a magnetic flux across the joined ends of the back yoke. When the joined ends of the back yoke are welded together from its outer periphery by using e.g. a laser, there is no concern that any coil on the inner periphery of the back yoke may burn out, even if there may be a gap between its joined ends, since a laser beam strikes against the crank-shaped bent surface therebetween. Moreover, it is possible to suppress the resonance of the joined ends of the back yoke which may be caused by a diametrically occurring electromagnetic vibration, in addition to preventing coil burnout during welding. Moreover, it is possible to secure a magnetic path.

The apparatus of the third embodiment of the present invention eliminates the necessity for a motor frame, since the molding resin forms a motor frame, and thereby eliminates the necessity for one bracket. The elimination of the necessity for one bracket makes it possible to shorten the distance between the winding and the bracket and thereby reduce the thickness of the motor.

The resin molding based on the inside diameter makes it possible to achieve coincidence between the inside diameter of the stator core and the longitudinal axes of the housing and socket portion and thereby improve the characteristics of the motor.

The motor frame formed from the resin enables the motor to have a long life without deteriorating, even if it is used in a highly humid environment, since the winding is covered with the insulating resin.

The resin covering the stator and forming the bracket makes it possible to reduce the thickness of the motor.

The resin covering the coils protects them from rubbing against each other irrespective of the vibration of the motor and makes them strong against wear and vibration-proof.

The winding covered with the insulating resin and the elimination of the necessity for one bracket make it possible to shorten the distance between the winding and the bracket and thereby reduce the thickness of the motor.

The apparatus of the fifth embodiment of the present invention provides a compact motor as the control board is embedded therein.

The apparatus of the twelfth and thirteenth embodiments of the present invention provides a structure which comparatively facilitates the work of installation of the winding, and other elements gives a motor of good performance.

The apparatus of the fourteenth embodiment of the present invention withstands a long period of use without rusting, even when operating in a highly humid place.

BRIEF DESCRIPTION OF THE DRAWINGS

FIG. 5 is a perspective view of the straight core as viewed from its outer periphery;

DETAILED DESCRIPTION OF THE INVENTION

Description will now be made of the best modes of carrying out this invention starting with a first embodiment thereof. A three-phase brushless DC motor 50 according to the first embodiment of the invention and a process for manufacturing it will first be described with reference to FIGS. 1 to 8.

1. Construction of the Motor 50

Figure 1:
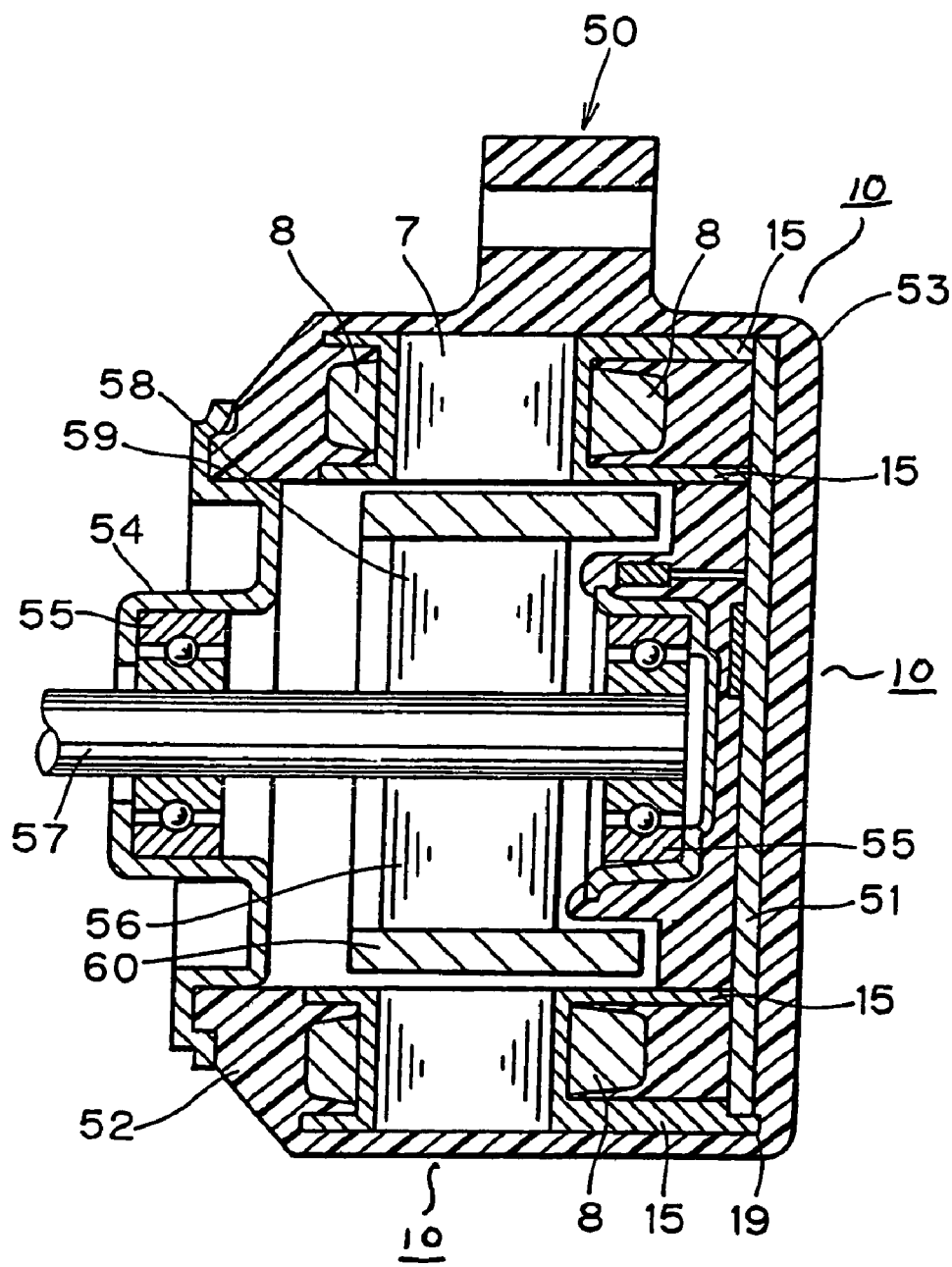
FIG. 1 is a sectional view of a motor according to a first embodiment of the invention.

The construction of the motor 50 will be described with reference to FIG. 1. FIG. 1 is a sectional view of the motor 50.

The motor 50 includes a motor frame 53, a rotor 56, a bracket 54 and two bearings 55. The motor frame 53, formed from an insulating molding resin 52, has a stator 10 and a wiring circuit board 51 embedded therein. The rotor 56 includes a rotary shaft 57, a permanent magnet 60 and a yoke 58. The rotor 56 is held in the socket portion 59 of the motor frame 53 and the bracket 54, rotatably by a bearing 55. The bracket 54 is press fitted in the socket portion 59 of the motor frame 53.

The motor 50, constructed as described, is suitable as a motor used in a highly humid environment, since a stator core 7, a winding 8 and the wiring circuit board 51, having a control circuit, are covered with the insulating molding resin 52, and there is no concern of any water reaching the stator core 7 or the winding 8. The molding resin 52 is an insulating resin, or premix.

The molding resin 52, covering the winding 8 and the wiring circuit board 51, makes a vibration-proof motor.

The molding resin 52, covering the winding 8, permits a reduction in the distance between a charging portion and the bracket 54, made of a steel sheet. The elimination of one bracket permits construction of a motor having a small thickness along the rotary shaft.

The embedded wiring circuit board 51 makes a compact motor.

Thus, the motor 50 is most suitable as a source of a driving force for rotating a fan or impeller in an air conditioner, pump, washing machine, air cleaner, or the like.

(2) Process for Manufacturing the Motor 50

A process for manufacturing the motor 50 will now be described with reference to FIGS. 2 to 4.

(2-1) Steps for Preparing the Stator Core 7

Figure 2:
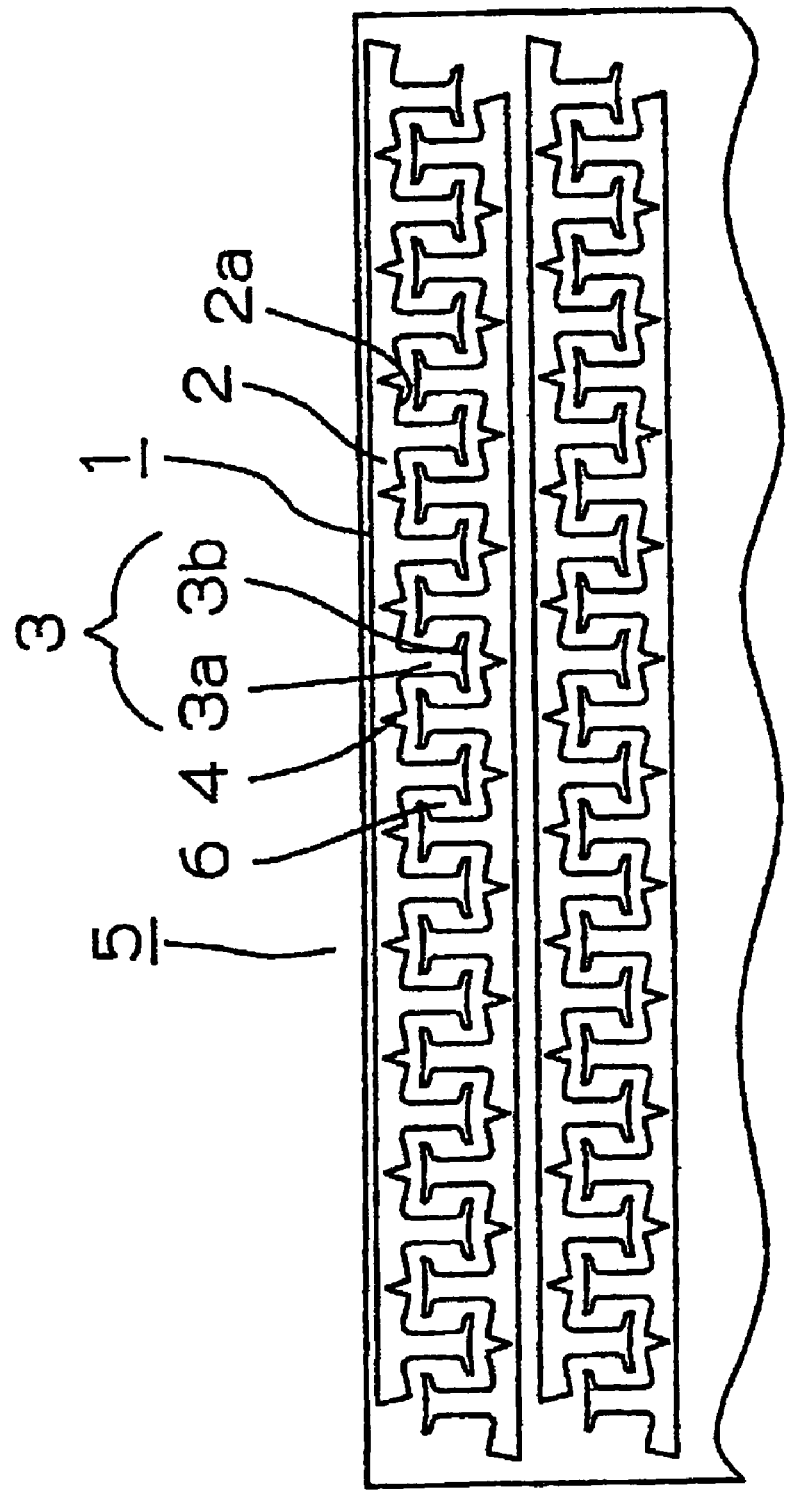
FIG. 2 is a top plan view of a punched sheet.

The stator core 7 is formed by stacking laminas 1, formed by punching a thin belt-shaped steel sheet (hereinafter called a hoop) 5, as shown in FIG. 2.

A plurality of (for example, eight) laminas 1 may be formed in parallel to one another across the width of the belt-shaped hoop 5, as shown in FIG. 2.

Each lamina 1 is formed by a belt-shaped back yoke 2 and 12 tees 3 extending from one long side 2a of the back yoke 2 at right angles thereto.

A V-shaped cut 4 is formed midway between every two adjoining tees 3 and on the long side 2a of the back yoke 2 from which the tees 3 extend.

Each tee 3 is T-shaped and is composed of a tee body 3a on which the wiring 8 is wound, and a horn-shaped converging portion 3b for causing magnetism to converge.

The punching steps will now be described.

During the first step, a belt-shaped hoop 5 is unwound from a coil.

During the second step, stop portions 21 are formed at specific intervals in the unwound hoop 5.

During the third step, the hoop 5 is transferred onto the punching table of a punching device.

During the fourth step, laminas 1 as described above, are cut out by a punch and allowed to drop into the receiving hole made in the punching table. One dropping lamina 1 is stacked on another immediately preceding lamina 1 and the laminas 1 as stacked are secured to each other at the stop portions 21 when pressed by the punch. The laminas 1 are stacked one upon another as described.

These manufacturing steps permit a continuous punching operation, as the hoop 5 is belt-shaped.

A plurality of laminas 1 can be stacked at one time, since a plurality of laminas 1 are formed in parallel to one another across the width of the belt-shaped hoop 5.

(2-2) Steps for Preparing Insulating Layers 12

The steps for preparing insulating layers 12 will now be described.

The insulating layers 12 are formed where they are required on the laminas 1 stacked as described above. This is due to the necessity for electrical insulation between the stator core 7 and the winding 8. The insulating layers 12 are formed by pre-molding from an insulating resin on the stacked laminas 1, held in a resin mold.

Figure 3:
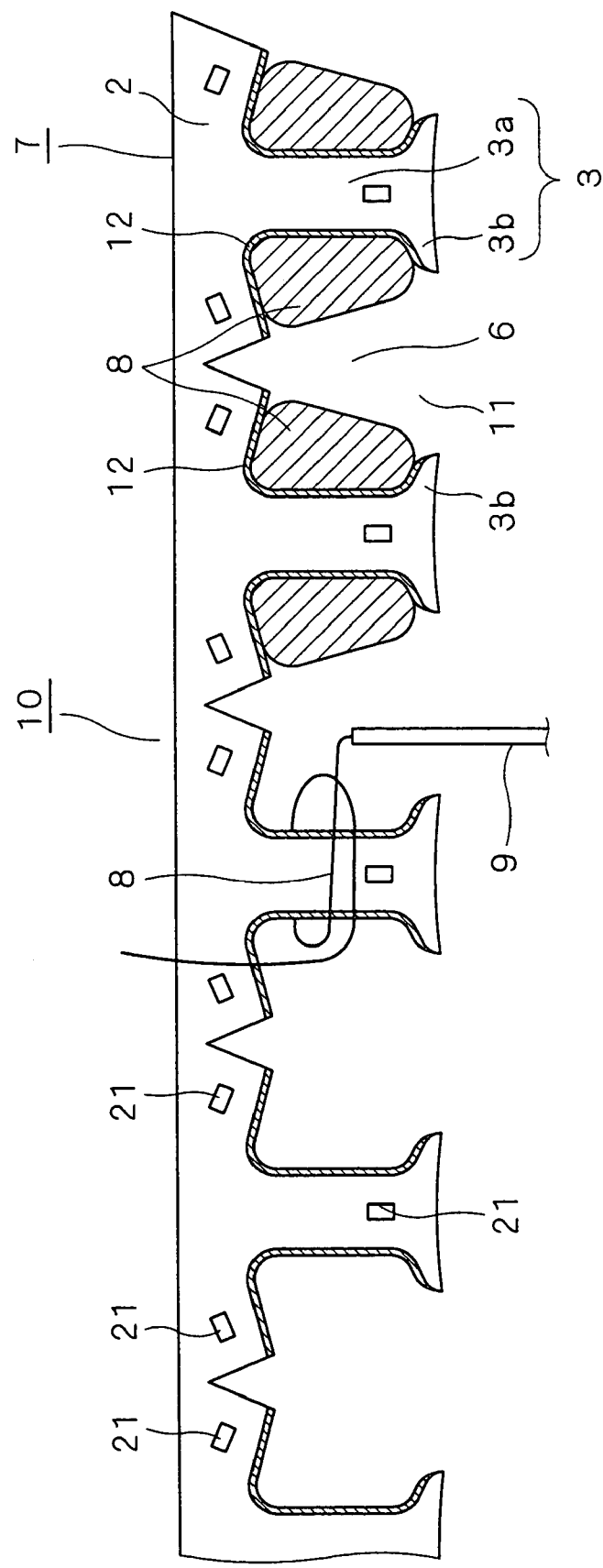
FIG. 3 is a front elevation view illustrating a winding pattern for a stator core.

The insulating layers 12 are formed on the portions, excluding the outer periphery, of the back yokes 2 and the inner periphery of the tees 3, as shown in FIG. 3. They are formed on the long side portions 2a of the back yokes 2, both sides of the tee bodies 3a, and the outer peripheral surfaces of the converging portions 3b.

Figure 4:
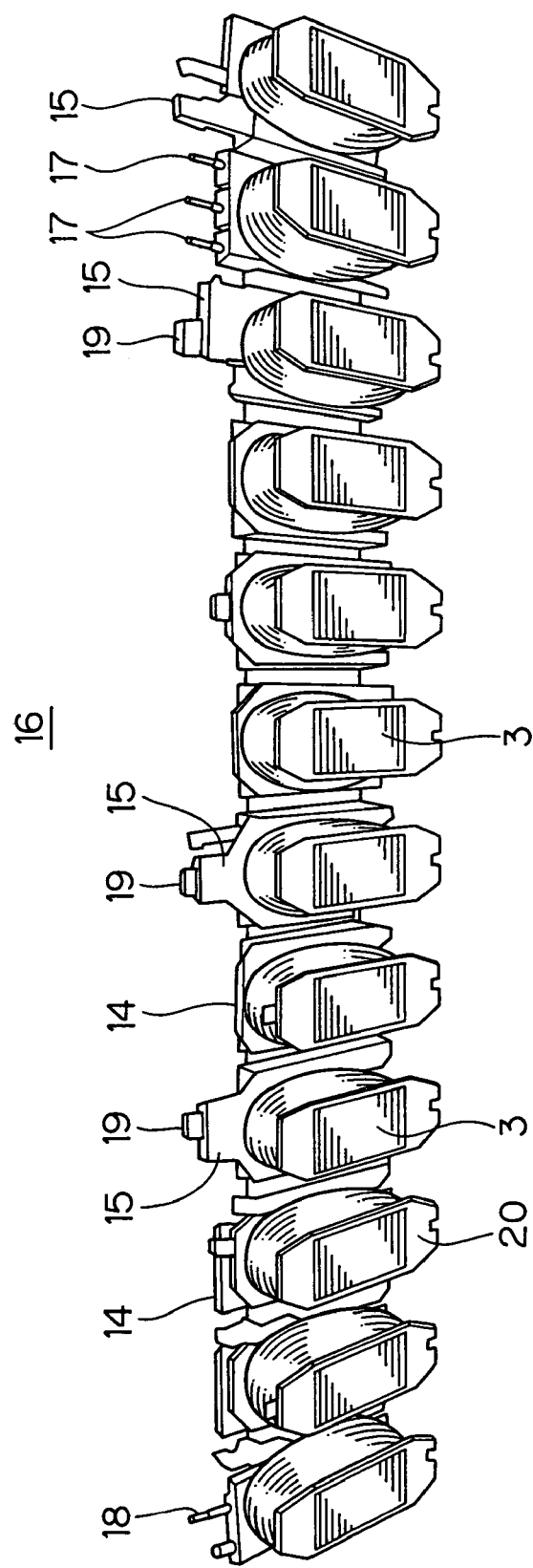
FIG. 4 is a perspective view of a straight core as viewed from its inner periphery.

Upper coverings 14, four upper supports 15, and positioning projections 19 are formed at the top of the back yokes 2 integrally therewith at the same time with the insulating layers 12, as shown in FIGS. 4 and 5. Lower coverings 20 are also formed at the bottom of the back yokes 2, integrally therewith, at the same time with the insulating layers 12.

The upper coverings 14 have securing holes formed for securing binding pins 17 and 18, as will be described below. The four upper supports 15 protrude from the upper coverings 14 and define a table for mounting the wiring circuit board 51, and the positioning projections 19 protrude integrally from the upper supports 15. The upper supports 15 are formed on the fourth, sixth, tenth and twelfth tees 3 from the left end of the straight core 16, as shown in FIG. 4. A stack of laminas 1, having the insulating layers 12 formed thereon, is referred to as straight core 16.

Although the upper coverings 14 and the upper supports 15 have been described as being formed at the top of the back yokes 2 and the lower coverings 20 at the bottom thereof, the terms upper and lower have been used for convenience of description with reference to FIGS. 4 and 5.

(2-3) Steps for Securing Binding Pins 17 and 18

The steps for securing the binding pins 17 and 18 will now be described with reference to FIGS. 4 and 5.

Three phase binding pins 17, each for one phase, are first inserted in the securing hole of an upper covering 14 on or near the outer periphery of the back yokes 2 in the straight core 16 and caused to protrude from the straight core 16, as shown in FIG. 4. More specifically, the three phase binding pins 17 are caused to protrude from the outer periphery of one of the first, second and third tees 3 from the right end of the straight core 16. It is alternatively possible to cause the U-phase, V-phase and W-phase binding pins 17 to protrude from the first, second and third tees, respectively, from the right end of the straight core 16.

Then, a neutral point binding pin 18 is inserted in the securing hole of another upper covering 14 on or near the outer periphery of the back yokes 2 in the straight core 16 and is caused to protrude from the straight core 16, as shown in FIGS. 4 and 5. More specifically, the neutral point binding pin 18 is caused to protrude from the outer periphery of one of the first, second and third tees 3 from the left end of the straight core 16.

(2-4) Winding Steps

Description will now be made of the winding steps for putting the three phase windings 8 about the straight core 16 having 12 slots.

A nozzle 9 having a winding 8 passed therethrough is moved around each tee body 3a of the stator core 7 to have the winding 8 wound about the tee body 3a, as shown in FIG. 3. The winding is carried out on the tees 3, juxtaposed in parallel to one another.

As the stator 10 has twelve (12) tees 3, three nozzles 9 are juxtaposed so as to correspond to three tees 3, respectively, and carry out winding around them simultaneously. After their winding, the nozzles are moved to other slots and such winding is repeated four times, whereby winding is carried out in all of the 12 slots. The winding for the U phase is carried out in the first, fourth, seventh and tenth slots from the left end of the straight core 16, the winding for the V phase in the second, fifth, eighth and eleventh slots, and the winding for the W phase in the third, sixth, ninth and twelfth slots.

Thus, it is possible to finish a winding job at a high speed and select the number of turns of winding as desired, as compared with the winding for an annular stator core. The windings 8 put about the tees 3 juxtaposed in parallel to one another achieve an improved ratio of occupation in each slot 6. When the tees 3 are juxtaposed in parallel to one another, the distance between either end of the converging portion 3b of one tee 3 and the adjacent end of the converging portion 3b of each adjoining tee 3 or the width of each opening 11 and the area of each slot 6 are greater than the width of each opening 11 and the area of each slot 6, which occur after the back yokes 2 are bent, as will hereinafter be described. Moreover, it is possible to put the winding 8 around without considering the space for the rotation of the nozzle 9 and thereby achieve an improved ratio of occupation over what has hitherto been possible. Moreover, as the stator core 7 having twelve (12) tees 3 does not have a large number of slots, it allows an efficient winding job and makes a motor having a good balance between its fabrication efficiency and characteristics.

(2-5) Steps for Connecting Wiring

Description will now be made of the steps for connecting wiring between the winding 8 for each phase and the winding 8 for the neutral point. A star connection of the three phases is made.

The U-phase winding 8 is bound with the U-phase binding pin 17 at one end and with the neutral point binding pin 18 at the other end. The V-phase winding 8 is bound with the V-phase binding pin 17 at one end and with the neutral point binding pin 18 at the other end. The W-phase winding 8 is bound with the W-phase binding pin 17 at one end and with the neutral point binding pin 18 at the other end.

The wiring for connecting the winding 8 for each phase to the neutral point binding pin 18 is made as shown in FIG. 5. More specifically, the other end of the U-phase winding 8, put around the tee 3 for the U phase, is drawn to the top of the tee 3, then to the outer periphery of the upper covering 14 through its upper slot 14a and then to the neutral point binding pin 18 along the outer periphery of the upper covering 14, and is fastened to the neutral point binding pin 18. The same is repeated for the windings 8 for the other two phases.

The wiring for connecting the winding 8 for each phase to the binding pin 17 for each phase is made as shown in FIG. 5. More specifically, one end of the U-phase winding 8, put around the tee 3 for the U phase, is drawn to the bottom of the tee 3, then to the outer periphery of the lower covering 20 through its lower slot 20u and then to the U-phase binding pin 17 along the outer periphery of the lower covering 20, and is fastened to the U-phase binding pin 17. The same is repeated for the windings 8 for the other two phases. The lower slot 20u for the U-phase, the lower slot 20v for the V phase and the lower slot 20w for the W phase have a greater depth in their order, so that the windings 8 for the three phases may lie in parallel to one another along the outer periphery of the lower covering 20 and not contact one another.

(2-6) Steps for Bending the Straight Core 16

The steps for bending the straight core 16 will now be described.

Figure 6:
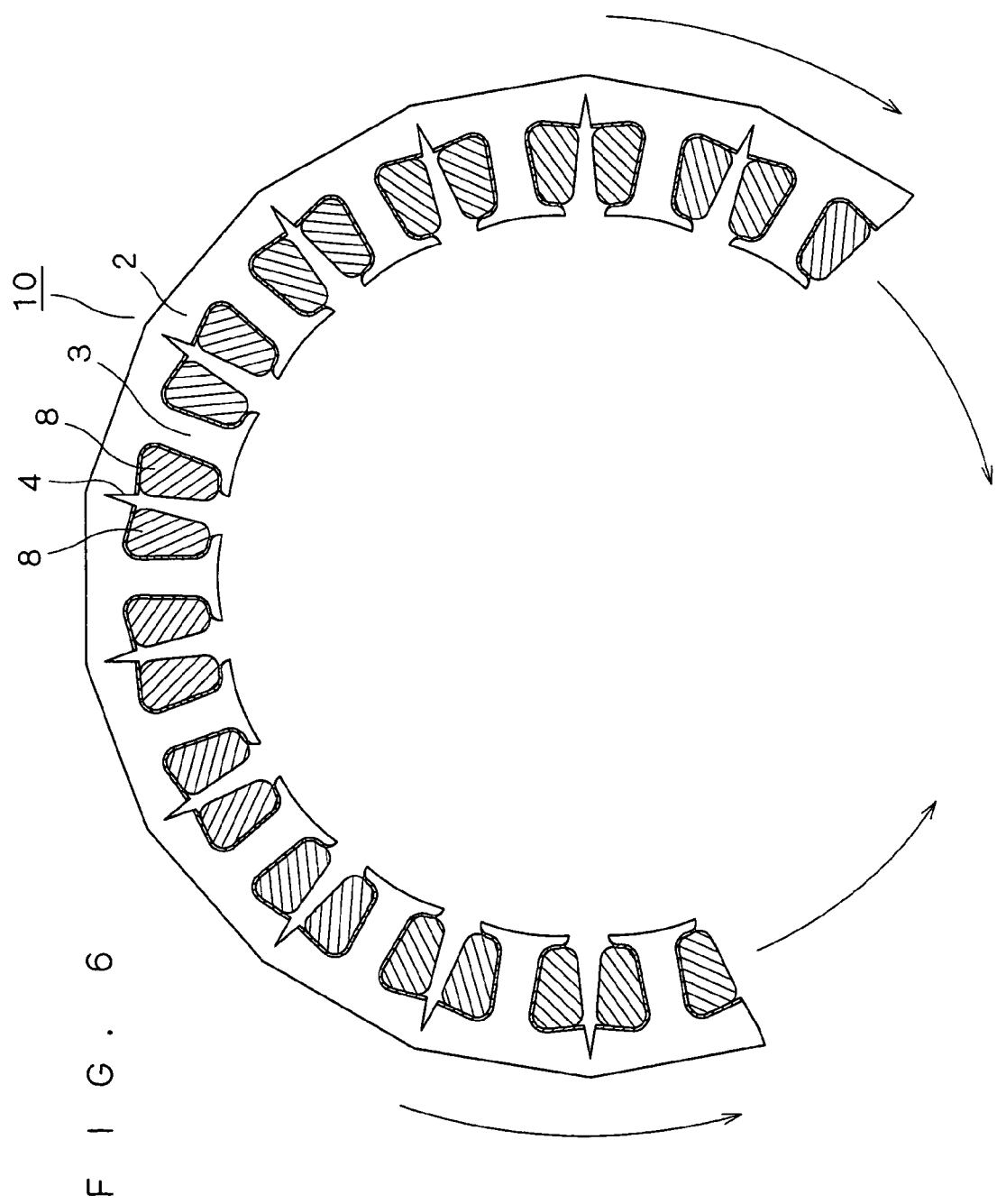
FIG. 6 is a front elevation view illustrating a process for bending a straight core.
Figure 7:
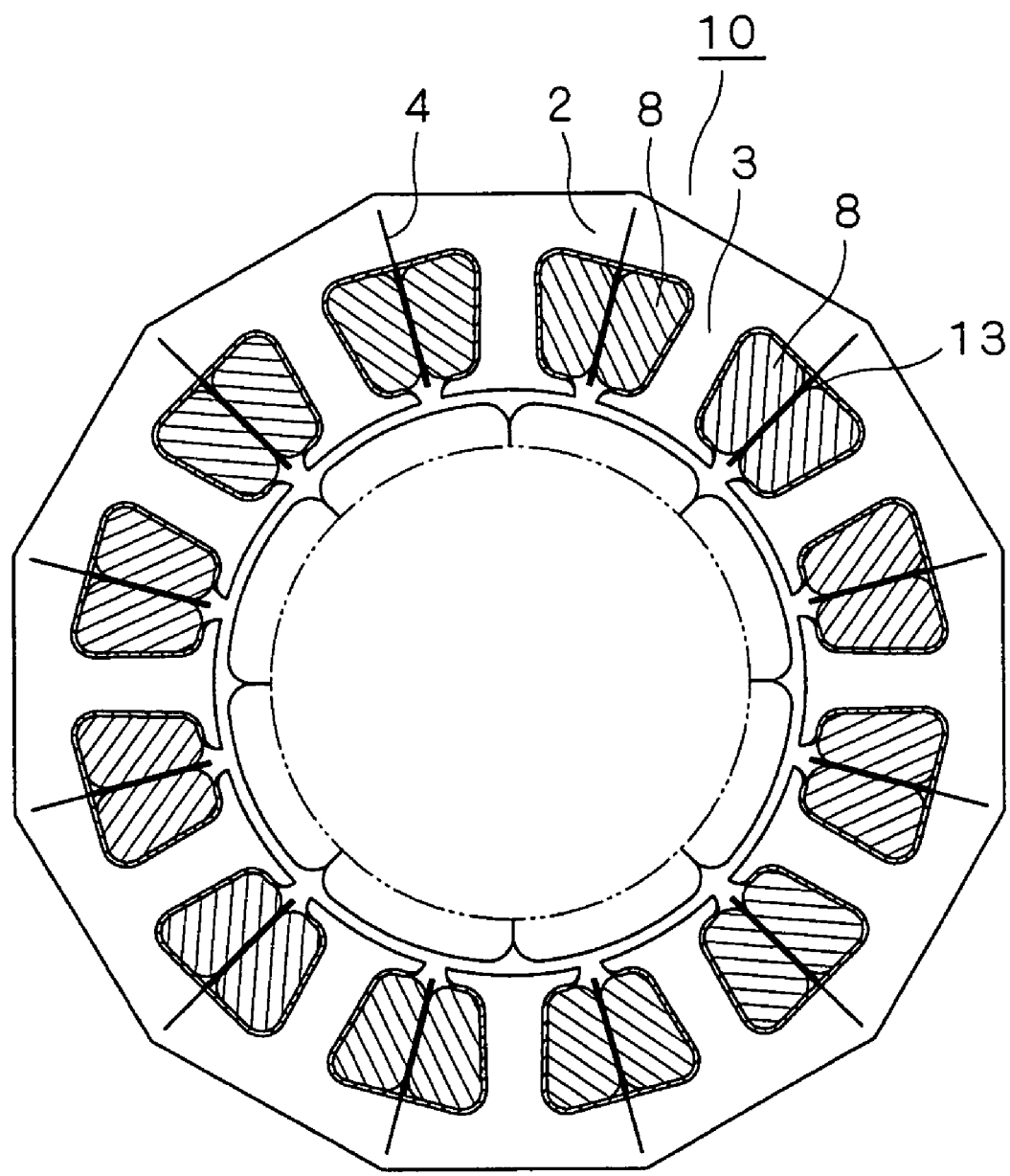
FIG. 7 is a front elevation view of a stator made by bending the straight core into an annular shape.

During the first step, the straight core 16, having the windings put thereon, is bent at each cut 4 so that the tees 3 may be radially directed, as shown in FIGS. 6 and 7.

During the second step, the back yokes 2 are bent into an annular shape.

During the third step, the opposite ends of the back yokes 2 are joined to each other by welding or with an adhesive. As a result, the inner rotor type stator 10 is formed.

The cuts 4 have a cut angle which allows the opposite slanting surfaces of each cut 4 to contact each other when the back yokes 2 are formed into an annular shape. An insulator 13 is inserted between the winding 8, put around one tee 3 and the winding 8, put around any adjoining tee 3, in the event that they are likely to contact each other.

(2-7) Steps for Mounting the Wiring Circuit Board 51

The steps for mounting the wiring circuit board 51 will now be described.

The wiring circuit board 51 is disk-shaped and has a bushing 25 attached to its outer periphery. The bushing is made from a synthetic resin and is used for guiding a plurality of cords 26 from the wiring circuit board 51 to outside the motor 50.

Figure 8:
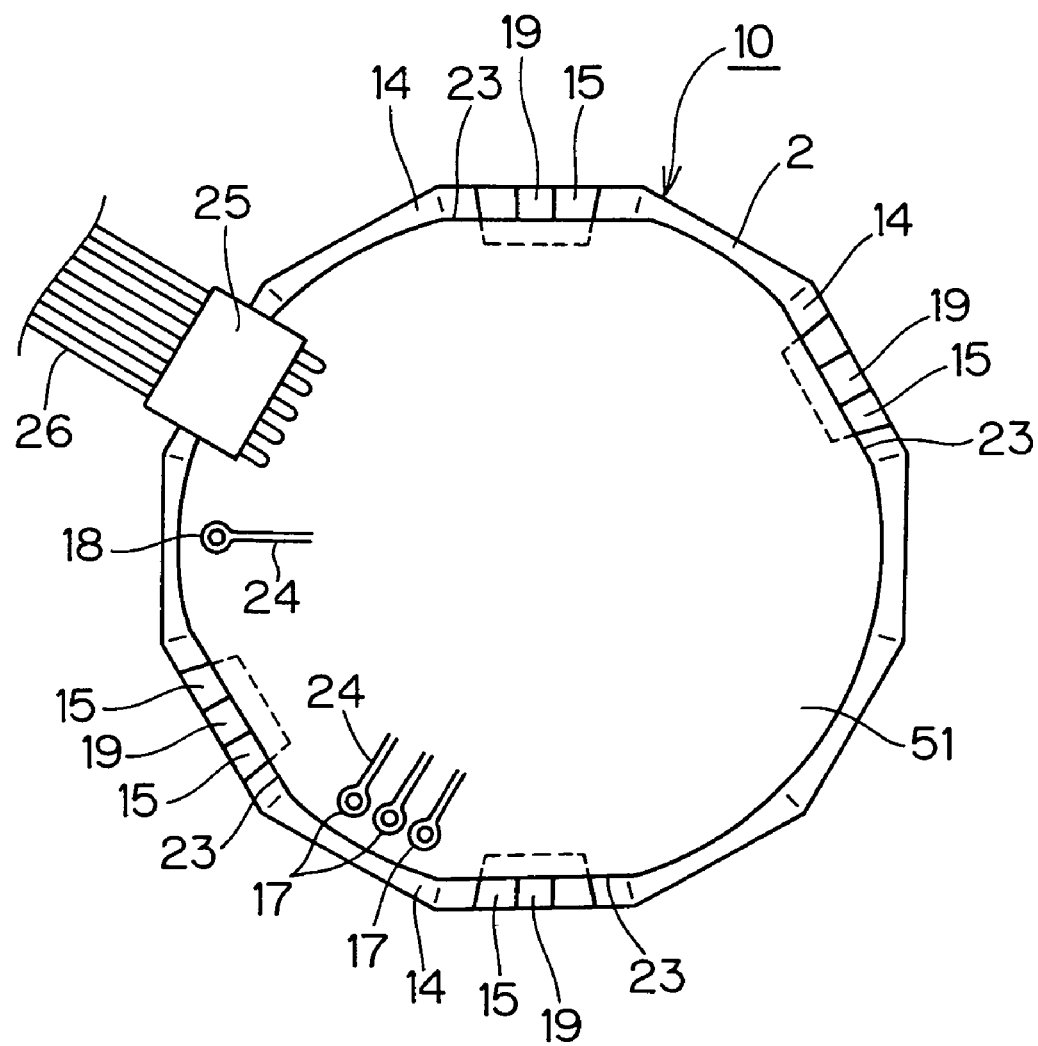
FIG. 8 is a top plan view showing a wiring circuit board mounted on the stator.

The disk-shaped wiring circuit board 51 is placed on the upper supports 15 of the stator 10 as shown in FIG. 8. The wiring circuit board 51 has four cut-off portions 23 made on its outer periphery and the four positioning projections 19 are fitted on the four cut-off portions 23, respectively, to position the wiring circuit board 51 relative to the stator 10. The four upper supports 15 formed on the fourth, sixth, tenth and twelfth tees 3 from the left end of the straight core 16 are arranged in a diametrically opposite relation, as shown in FIG. 8, to provide a stable mount for the wiring circuit board 51, while the positioning projections 19 ensure the coaxial positioning of the wiring circuit board 51 with the stator 10. Moreover, the four positioning projections 19 situated in a diametrically opposite relation hold the wiring circuit board 51 against being pushed out by molding resin during molding as will be described below.

The wiring circuit board 51 has wiring patterns 24 and four connecting holes made for receiving the binding pins 17 for the three phases and the binding pin 18 for the neutral point, respectively. When the wiring circuit board 51 is placed on the stator 10, as explained above, the binding pins 17 for the three phases and the binding pin 18 for the neutral point are inserted through the four connecting holes, respectively, and are soldered to the wiring patterns. As a result, the windings 8 for the three phases and the winding 8 for the neutral point are easily connected to the wiring circuit board 51.

(2-8) Steps for Making the Motor Frame 53

The motor frame 53 will now be described. For the case where the stator 10, holding the wiring circuit board 51, as described above, is fitted in a traditional motor frame made of a steel plate to assemble a motor, the axis of the stator core 7, based on its inside diameter, does not coincide with its axis based on its outside diameter, since the outside diameter of the stator 10 is not a true circle. It is, therefore, difficult to assemble a motor by relying upon the outer periphery of the stator 10. A reduction in the mounting accuracy of rotary bearings, and the like, on a motor frame made of a steel plate, gives a product of low performance.

According to the first embodiment of this invention, therefore, the motor frame 53 is formed by molding from an insulating resin, or premix (hereinafter called the molding resin) by employing the inside diameter of the stator 10 as a standard for molding. More specifically, the inside diametrical portion of the stator 10, holding the wiring circuit board 51, as described above, is fitted around a core in a resin mold (not shown), and after the mold is closed, the molding resin is supplied at a high pressure into the mold. As a result, the stator core 7, wiring circuit board 51, and related elements are integrally covered with the molding resin 52 to give a molded motor frame 53.

As the housing for holding the bearing 55 for supporting the rotor 56 and the socket portion 59 for holding the bracket 54 are formed at the same time by employing the inside diameter of the stator core 7 as a standard for molding, the axis of the stator core 7, based on its inside diameter, the axis of the housing, and the axis of the socket portion 59, coincide with one another to give a motor of high accuracy having a uniform air gap. The bearing housing is coaxial with the stator 10, as it can be formed integrally with the motor frame 53 by employing the inside diameter of the stator 10 as a standard. The socket portion 59 with which the bracket 54 engages is also coaxial with the stator 10, as it is also formed with the motor frame 53. Thus, the motor frame 53 ensures a high accuracy of assembly.

SECOND EMBODIMENT

A second embodiment of the invention, relating to the joined ends of the back yokes 2 of the stator 10, will now be described with reference to FIGS. 9 and 10.

In the event that the joined ends of the back yokes 2 are flat and are welded only at their outer periphery, as according to the first embodiment of the invention, the back yokes in the vicinity of their joined ends are likely to resonate with a diametrically occurring electromagnetic vibration and cause undulation about the welded joint. This problem is overcome by crank-shaped joined ends 44 according to the second embodiment of the invention.

Figure 9:
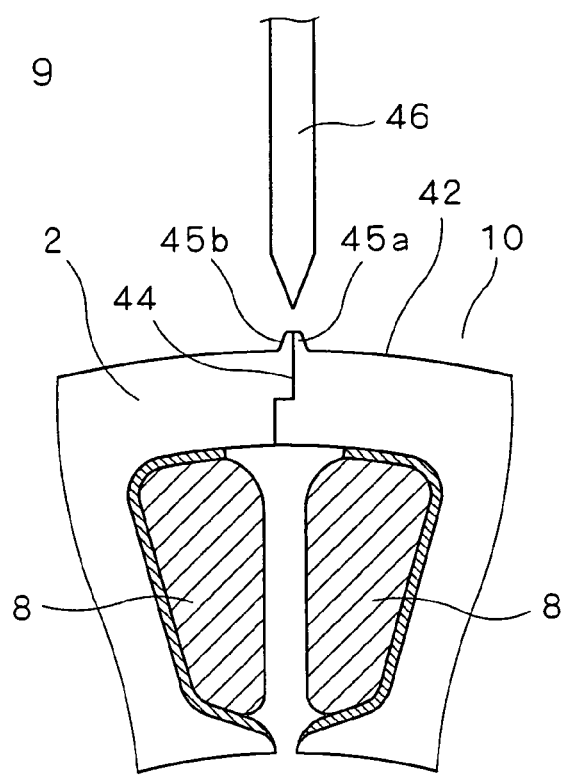
FIG. 9 is an enlarged front elevation view of a back yoke portion including its joined ends according to a second embodiment of the invention.
Figure 10:
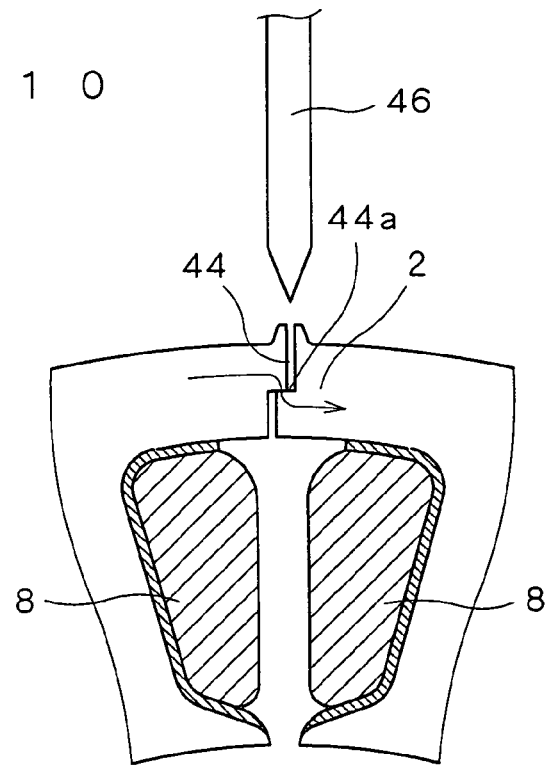
FIG. 10 is an enlarged front elevation view of a back yoke portion including its joined ends having a gap formed therebetween.

FIG. 9 is an enlarged front elevational view of the joined ends 44 of a back yoke 2 according to the embodiment under description and their vicinity, and FIG. 10 is an enlarged front elevational view of the joined ends 44 of the back yoke 2 having a gap formed therebetween and their vicinity.

A stator 10 is made by bending a straight core 16 into an annular shape, as stated with reference to the first embodiment. The opposite ends 44 of the back yokes 2 in the straight core 16 are crank-shaped, as viewed from the axis of rotation. The back yokes 2 have projections 45a and 45b on their outer periphery at their opposite ends, respectively. The back yokes 2 are bent to have their projections 45a and 45b engage each other, and a laser 46 is brought close to the projections 45a and 45b for welding them together.

The structure as described ensures that even if any gap is formed between the joined ends 44 of the back yokes 2, as shown in FIG. 10, bent surfaces 44a, formed midway between the joined ends 44, form a wall preventing a laser beam from reaching the inside of the back yokes 2 and damaging the windings 8. Even if a gap is formed between the joined ends 44 of the back yokes 2, the bent surfaces 44a of the joined ends 44 remain joined to each other, so that a magnetic path is maintained, as shown by an arrow in FIG. 10, to ensure a good flow of magnetic flux.

Moreover, the crank-shaped joined ends 44 advantageously necessitate that the back yokes 2 are joined at two points, i.e. the welded joint (projections 45a and 45b) and the bent surfaces 44a of the joined ends 44. As a result, the joined ends 44 are extremely rigid so as not to readily undergo resonance. The stator 10 is improved in its strength against a molding pressure prevailing in the event of the molding of the motor frame from a molding resin, and does not easily get separated at the joined ends 44.

The joined ends 44 of the stator 10 may alternatively be formed by adhesion.

What is claimed is:

1. A molded motor comprising:
   a motor frame, molded by covering a stator, having a straight core and a wiring circuit board, with an insulating molding resin or premix therefor;
   the straight core comprising a stack of laminas, each having a plurality of tees projecting from one long side of a belt-shaped back yoke, and a V-shaped cut formed between every two adjoining tees along the back yoke and on a side from which the tees project;
   the straight core having an insulating layer, formed by pre-molding from an insulating resin, on portions of the straight core, excluding at least an inner periphery of each tee;
   the straight core having a plurality of supports, which, together with a portion of the insulating layer, are pre-molded on one side of the straight core, for mounting the circuit board and the insulating layer;
   the straight core further having a winding, wound around each tee, having the insulating layer formed thereon;
   the straight core still further having a covering, which together with another portion of the insulating layer, are pre-molded on one side of the back yoke of the straight core, and a plurality of binding pins projecting from the covering, for connecting the winding wound on each tee;
   the stator being formed by bending the straight core at the V-shaped cuts, into an arcuate or annular shape, and joining opposite ends of the back yokes to each other by welding or adhesion, such that the winding on each tee is wired and connected to other of the windings;
   the motor frame being molded as a single body around a longitudinal axis of the stator mounting the wiring circuit board thereon, and entirely covering the stator, except for an inside diametrical portion thereof; and
   wherein said molded motor is a brushless DC motor.

2. The molded motor according to claim 1, wherein the straight core has a plurality of supports, with the insulating layer, pre-molded on one side thereof, for mounting the wiring circuit board.

3. The molded motor according to claim 2, wherein positioning projections, for positioning the wiring board, protrude from the supports therebetween.

4. The molded motor according to claim 1, wherein the binding pins are formed on the back yoke situated on the outer periphery of the first to third tees from the tee at either end of the straight core.

5. The molded motor according to claim 1, wherein the binding pins include a neutral point binding pin formed on the back yoke situated on the outer periphery of one of the first to third tees from the tee at one end of the straight core, while the binding pin for each phase is formed on the back yoke situated on the outer periphery of one of the first to third tees from the tee at the other end of the straight core, or a plurality of such tees.

6. The molded motor according to claim 1, wherein there are 12 tees.

7. The molded motor according to claim 1, wherein the brushless DC motor is three-phase; there are 12 tees; and there is a U-phase winding around the first, fourth, seventh and tenth tees from the tee at either end of the straight core; there is a V-phase winding around the second, fifth, eighth and eleventh tees; and a W-phase winding around the third, sixth, ninth and twelfth tees.

8. The molded motor according to claim 1, for use as a motor for an air conditioner, pump, washing machine, or air cleaner.

* * * * *